(No Model.)

V. LAPP.
APPARATUS FOR CONVEYING AND DRAWING OFF BEER.

No. 581,355. Patented Apr. 27, 1897.

WITNESSES

INVENTOR

BY

ATTORNEY

UNITED STATES PATENT OFFICE.

VALENTIN LAPP, OF LEIPSIC, GERMANY.

APPARATUS FOR CONVEYING AND DRAWING OFF BEER.

SPECIFICATION forming part of Letters Patent No. 581,355, dated April 27, 1897.

Application filed April 29, 1896. Serial No. 589,510. (No model.)

*To all whom it may concern:*

Be it known that I, VALENTIN LAPP, of Leipsic-Lindenau, Saxony, Germany, have invented a certain new and useful Improvement in Apparatus for the Conveyance and Drawing Off of Beer, of which the following is a specification.

This invention relates to a vessel for the conveyance and drawing off of beer by means of a pressure chamber or receptacle combined with the beer vessel and charged with carbonic acid at a comparatively low pressure, which vessel may also serve for pasteurizing or cooling and keeping cool the beer for domestic use. The said vessel is shown in several modified constructions in the accompanying drawings, which forms part of this specification.

Figure 1:
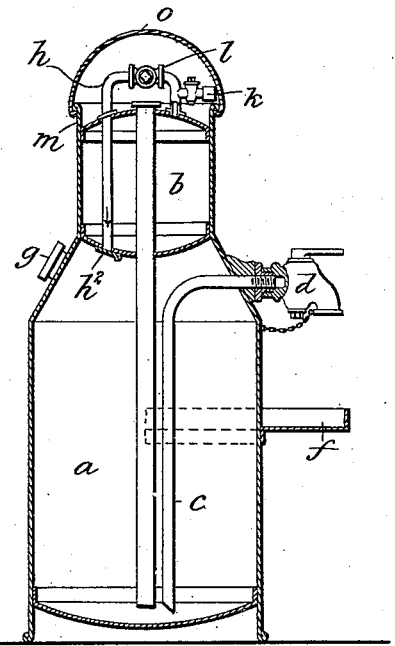
Figure 2:
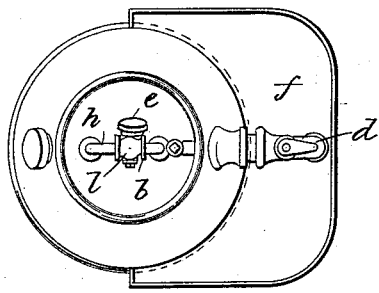
Figure 3:
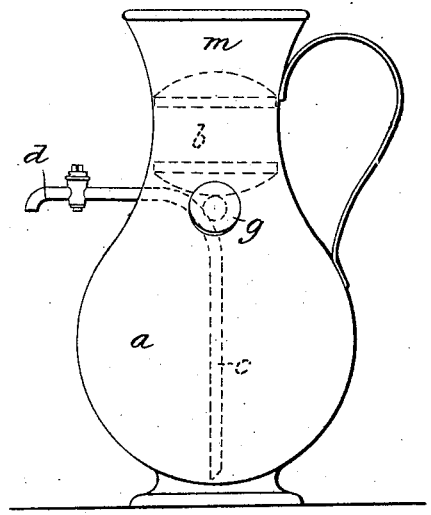

Figure 1 shows a vertical section, and Fig. 2 shows a plan, of one arrangement. Fig. 3 is a side elevation showing a modification.

Similar letters of reference indicate corresponding parts in all the figures where they appear.

The vessel $a$ serves for containing the beer, while the vessel $b$, combined therewith, serves to contain the carbonic acid.

The vessel $a$ can be made of a capacity equal to about five liters, while the vessel $b$ has a capacity of about one and one-half liters of carbonic acid of low pressure, but other suitable capacities can be taken. In the beer vessel $a$ is a discharge-pipe $c$, reaching down to the bottom, the upper end of this pipe being connected to a discharge-cock $d$. For catching any dripping beer a tray $f$ may be fixed to the vessel $a$, extending about half around it. For filling the vessel $a$ a tightly-stoppered opening $g$ is provided.

The gas-chamber $b$ constitutes a separate part and is made of such a size relatively to the capacity of the beer-receptacle $a$ that a charge of gas (carbonic acid) of low pressure, such as about one and one-half to two atmospheres, is sufficient for forcing out the whole of the beer. This chamber $b$ can be soldered or otherwise arranged in position with respect to the vessel $a$. For conducting the carbonic acid from $b$ into $a$ a tube $h$ is provided, the part of which outside the vessel $b$ is provided with a closing device or a pressure-reducing device $l$. Such external part also has a branch $k$, with a cock for connection with a conduit for the introduction of fresh charges of carbonic acid into the vessel $b$ from a suitable supply. The pipe $h$ is conveniently led through the vessel $b$ and can be provided at its entrance into the vessel $a$ with a check-valve $h^2$. This arrangement of the pipe $h$ protects the same against fracture or damage when cleaning or transporting the apparatus.

The part of the pipe outside the chamber $b$ provided with the pressure-reducing device $l$ and the gas-charging cock is fixed to the chamber $b$ in such manner as to be readily removed therefrom.

At the bottom the apparatus is provided with a circular rim of brass or other material, serving as a stand. The receptacles are preferably made of metal, such as sheet-copper, tinned inside and coated with enamel-lac, in order to prevent all contamination of the contents.

The drawing off of the beer from the above apparatus is effected by opening the tap $d$, whereupon the pressure from the carbonic-acid chamber will force out the beer, the carbonic acid flowing into the vessel $a$ in proportion as the beer flows out, the gas passing from the chamber $b$, through the pipe $h$, through the opened valve or reducing device $l$, and through the check-valve $h^2$ into $a$, where its pressure drives the beer up the pipe $c$ to the cock $d$. This action takes place as often as the cock $d$ is opened until the whole of the beer is discharged from $a$.

The pipe $c$ and cock $d$ are made sufficiently small and with reduced discharge-nozzle to prevent the beer from frothing unduly on issuing.

By making the apparatus of metal, as described, they can be cleaned by steam, which is of particular importance for giving good clear beer.

It will be seen that in the construction illustrated in the first two figures the chamber $b$ has a cylinder $e$ extending centrally through it, its upper opening being slightly deflected to afford access thereto at one side of the pipe connections at the top of the chamber $b$, as indicated in Fig. 2. The major portion of said cylinder depends within the vessel $a$.

A removable cap $o$ is fitted upon the rim or top extension $m$ to further protect the important parts at the top of the apparatus.

The described construction and arrangement of the interior of the receptacle $b$ has the advantage of more convenient construction and the possibility of changing the inner receptacle if suitable packing be employed, but the receptacle $b$ can also be permanently combined with the vessel $a$.

Fig. 3 shows an apparatus in which the carbonic-acid receptacle $b$ is contained in the neck of the beer vessel $a$. The construction of the latter is substantially the same as that shown in Figs. 1 and 2.

When it is desired to pasteurize beer or other cooked liquid by means of the apparatus, the proceeding is as follows: The receptacle $a$ is filled with the liquid to be treated, the charging-opening $g$ is closed, and hot water is introduced into the receptacle $a$. This may be obtained by blowing in steam of the required temperature at which it will be sterilized.

By allowing any vapors generated to escape it is possible to use vessels with very thin walls, and the pressure that would be produced if the gases or vapors could not escape need not be equalized by means of special apparatus.

After the pasteurizing is completed the vessel $e$ has the hot water discharged from it and is filled with ice for cooling the pasteurized liquid. During the cooling carbonic acid is led from a separate carbonic-acid vessel into the vessel $b$. The beer can then remain any length of time in the vessel. When it is to be drawn off, it is only necessary to admit through the carbonic-acid conduit a certain pressure into the vessel $a$ for forcing the beer through the pipe $c$ and the opened cock $d$. The double receptacle enables the vessel $a$, containing the liquid, to be opened and closed without prejudicing the sterilization, and it also enables the liquid to be impregnated with carbonic-acid gas without affecting the beer previously sterilized and rendered poor in alcohol; also the impregnation with carbonic acid can be effected after cooling or after a considerable lapse of time without affecting the sterilization of the beer.

In conclusion, it is to be noted that it is advisable to protect the fittings situated at the top, such as the connecting-pipe $h$, with the reducing-valve $l$ and the filling-branch $k$, either by means of a special cover $o$, as shown at Fig. 1, or by means of a high extension, as shown at Fig. 3. By this means the transport of these beer vessels will be facilitated and the durability thereof increased.

My gas vessel $b$ fills the entire neck of the vessel and gives great capacity, so that sufficient gas may be received at a moderate pressure to enliven the contents of the vessel below. The rim by extending up beyond the gas vessel, as indicated by $m$, may afford a sufficient protection for the valves and pipes, which are also above the gas vessel; but I prefer to complete the protection by cap $o$. This latter cap may be easily supplied and removed.

I claim as my invention—

1. Apparatus for the conveyance of beer and for drawing the same off by means of carbonic acid at low pressure consisting of a beer vessel $a$ with rising discharge-pipe $c$ and cock $d$, filling-opening $g$ for beer, and the carbonic-acid receptacle $b$ forming a closure for the neck-opening of the apparatus, with the valve $l$ and pipe $h$ connecting the vessels $a$ and $b$, and having a branch $k$ for charging the carbonic acid, substantially as described.

2. Apparatus for the conveyance of beer and for drawing the same off by means of carbonic acid at low pressure consisting of a beer vessel $a$ with rising discharge-pipe $c$ and cock $d$ filling-opening $g$ for beer and the carbonic-acid receptacle forming a closure for the neck-opening of the apparatus with the valve $l$ and pipe $h$ connecting the vessels $a$ and $b$, in combination with a projecting rim $m$ for protecting the connecting-pipe $h$, valve $l$ and charging-branch $k$ for carbonic acid, substantially as described.

3. Apparatus for the conveyance of beer and for drawing the same off by means of carbonic acid at low pressure consisting of a beer vessel $a$ with rising discharge-pipe $c$ and cock $d$ filling-opening $g$ for beer and the carbonic-acid receptacle $b$ forming a closure for the neck-opening of the apparatus with the valve $l$ and pipe $h$ connecting the vessels $a$ and $b$ in combination with a projecting rim $m$ and also with a cap $o$ for protecting the connecting-pipe $h$, valve $l$ and charging-branch $k$ for carbonic acid, substantially as described.

4. Apparatus for the conveyance of beer and for drawing the same off by means of carbonic acid at low pressure consisting of a beer vessel $a$ with rising discharge-pipe $c$ and cock $d$ filling-opening $g$ for beer and the carbonic-acid receptacle $b$ forming a closure for the neck-opening of the apparatus with valve $l$ and pipe $h$ connecting the vessels $a$ and $b$, in combination with a vessel or chamber $e$ extending into the beer vessel $a$ and serving for the pasteurizing, cooling and keeping cool the beer, substantially as herein specified.

In testimony whereof I have hereunto set my hand, at Leipsic-Lindenau, this 16th day of March, 1896, in the presence of two subscribing witnesses.

VALENTIN LAPP.

Witnesses:
JOSEF GROSS,
OTTO J. SCHNITZ.